United States Patent [19]

Sidwell

[11] Patent Number: 4,572,549
[45] Date of Patent: Feb. 25, 1986

[54] SUBSEA PIPELINES

[75] Inventor: Derek Sidwell, Arlington, Tex.

[73] Assignee: Cameron Iron Works, Inc., Houston, Tex.

[21] Appl. No.: 525,637

[22] Filed: Aug. 23, 1983

[30] Foreign Application Priority Data

Aug. 24, 1982 [GB] United Kingdom ................ 8224231
Oct. 4, 1982 [GB] United Kingdom ................ 8228307
Nov. 2, 1982 [GB] United Kingdom ................ 8231343

[51] Int. Cl.⁴ ............................................. F16L 55/00
[52] U.S. Cl. .................................. 285/39; 285/333; 285/355; 285/390
[58] Field of Search ............... 285/333, 334, 390, 355, 285/39, 31, 32, 319; 166/242, 320

[56] References Cited

U.S. PATENT DOCUMENTS

| | | | |
|---|---|---|---|
| 820,774 | 5/1906 | Flyberg | 285/319 X |
| 1,079,681 | 11/1913 | Wintroath | 285/333 X |
| 1,223,591 | 4/1917 | Layne | 285/15 |
| 1,236,145 | 8/1917 | Burns | 285/390 X |
| 1,344,774 | 6/1920 | Stafford | 285/333 X |
| 1,364,478 | 1/1921 | Boyd et al. | 285/15 |
| 1,648,032 | 10/1927 | Wilson | 285/334 X |
| 2,117,357 | 5/1938 | Peterson | 285/333 X |
| 3,080,179 | 3/1963 | Huntsinger | 285/333 X |
| 3,232,638 | 2/1966 | Hollander | 285/390 X |
| 3,388,752 | 6/1968 | Hanes et al. | 285/334 X |
| 3,520,561 | 7/1970 | Rininger | 285/390 X |
| 3,658,366 | 4/1972 | Welch, Jr. et al. | 285/31 X |
| 3,784,238 | 1/1974 | Chance et al. | 285/333 X |
| 4,093,281 | 6/1978 | Jansen, Jr. | 285/334 X |
| 4,373,753 | 2/1983 | Ayers et al. | 285/319 |

FOREIGN PATENT DOCUMENTS

| | | | |
|---|---|---|---|
| 34436 | 8/1981 | European Pat. Off. | 175/320 |
| 3250 | 3/1916 | United Kingdom | 285/333 |

Primary Examiner—Richard J. Scanlan, Jr.
Attorney, Agent, or Firm—Vinson & Elkins

[57] ABSTRACT

A pipeline connector capable of functioning as a buckle arrestor which is a tubular member having two sections with a suitable profile for threaded or collet connection of the two sections in axial alignment with each other. A method of repairing a pipeline having the improved connector of the present invention including the steps of removing the damaged section of pipeline, locating new section of pipeline with collet type connectors on each end in place of the damaged section and connecting the new section.

4 Claims, 10 Drawing Figures

SUBSEA PIPELINES

BACKGROUND

This invention relates to subsea pipelines.

Subsea pipelines are used to transport hydrocarbon fluids, such as oil or gas, across seas or oceans or from drilling stations to a shore location. Such pipelines generally comprise tubular sections which are joined together axially to form the pipeline. The joining can be carried out by welding or by a mechanical connector.

Subsea pipelines are now being used at considerable depths e.g. 2000 to 3000 feet below the surface of the oceans. A problem with such pipelines is damage which can occur at these extreme depths and particularly the remedy or repair of such damage.

There are alternative ways of dealing with the problem. One is to provide a replacement pipeline. This can be done at the time of laying the original pipeline i.e. provide a standby pipeline for use in the event of damage to the one being used. However, this is extremely costly and in any event the second standby pipeline is also vulnerable to damage and deterioration. If the second pipeline is not laid until the first is damaged, the result is loss of service for a considerable time. Such a repair method is thus unsatisfactory.

Two other possibilities are in situ repair or replacement of the damaged section which generally are less costly than the provision of a standby pipeline. Both require certain operations to be carried out at depth. These operations can be carried out by hyperbaric divers, by the use of manned submersibles or by the use of a remotely controlled vehicle linked to the surface by an umbilical depending on the depth. In general the depth capabilities are up to 1000 feet for hyperbaric divers, up to 3000 feet for manned submersibles and up to 6000 feet for unmanned submersibles.

In situ repair can be effected by welding or by installing a mechanical seal. Welding is costly and requires complex equipment and qualified operators. Secondly the welder is at sea-water pressure and thus welding can only be carried out at depths of 1000 feet or less. Mechanical seals can be installed by divers, by using manned submersibles or by remote-controlled vehicles. However, at extreme depths when using manned submersibles or remotely controlled vehicles it is difficult to obtain satisfactory seals and the method has serious limitations. Replacement of a damaged section is less costly than the standby pipeline method and can be carried out relatively quickly. Additionally it does not suffer from the depth restrictions of welding nor does it have the limitations of the mechanical seal method.

SUMMARY

The present invention is concerned with improvements in subsea pipelines which facilitate replacement of damaged sections of the pipeline.

According to a first aspect of the present invention there is provided a buckle arrestor for use in a pipeline, said buckle arrestor being a generally tubular member which is arranged to be connected axially between two pipeline sections and having a wall thickness such that in use it resists propagation of buckles along the pipeline, said arrestor being profiled to define a means of attachment for a collet type connector.

The profile may comprise at least one annular flange. The arrestor may have two annular flanges disposed one toward each end portion of the arrestor. Alternatively, the profiled portion may be at a central region of the arrestor. In this case the arrestor may comprise two parts connected together, e.g. by welding, in axial alignment so that one part is a mirror image of the other.

According to a second aspect of the present invention there is provided a connector for connecting pipeline sections, said connector being of the type having interconnectible male and female portions, one portion in use being joined to an end of one pipeline section and the other portion being joined to the adjacent end of another pipeline section which is to be connected to the one section, each connector portion being profiled to define a means of attachment for a collet type connector. The profile may be an annular flange on each connector portion. The connector can be a connector/buckle arrestor which in addition to connecting pipeline sections, resists the propagation of buckles along a pipeline. The connector may be a screw connector.

To repair a damaged pipeline, the damaged section between two buckle arrestors or connectors is removed, a new section having collet type connectors is located between the two connections such that each collet type connector engages the profile portion on the respective buckle arrestor or connector. A seal can be provided on each end of the new pipeline section each seal being arranged to engage a sealing surface defined by the profiled portion. The removal and replacement of the damaged section can be carried out by using remotely controlled vehicles.

According to a third aspect of the present invention there is provided a method of repairing a pipeline which has pipeline sections connected together by buckle arrestors or connectors according to said first and second aspects, the method comprising the steps of removing a section of damaged pipeline which extends between two of said buckle arrestors or connectors, and locating a new section of pipeline which is provided at the end with a collet type connector in the place of the damaged section so that each collet type connector engages the attachment means provided on the respective pipeline buckle arrestor or connector. The method can be carried out using a remote controlled vehicle or vehicles which is coupled to the surface by an umbilical. The remotely controlled vehicle or vehicles can be used to locate a damaged section, attach guides to the pipeline buckle arrestors or connectors, cut the pipe section at its junction used to locate a damaged section, attach guides to the pipeline connectors, cut the pipe section at its junction with each pipeline connector, remove the damaged section and measure the required length of the replacement section.

A remotely controlled vehicle can also be used to lower a replacement section into position so that its collet type connectors engage the attachment means on the pipeline connectors. Where the arrestor or connector has flanges towards its end portions the step of removing the damaged section may include cutting the damaged section at its junction with the respective arrestor or connector. Where the arrestor has a central profiled portion the step of removing the damaged section may include cutting the respective arrestor at its central region. During repair of a damaged pipeline section, the damaged section is removed by cutting, cuts being through the arrestors at the ends of that section substantially at the position of the join between the parts which make up each arrestor. This leaves approximately one half of each arrestor connected to the pipeline and the profiled portion which is then on the end portion of each exposed part forms attachment means which can be engaged by a collet type connector on each end of a replacement pipeline section.

BRIEF DESCRIPTION OF THE DRAWINGS

The invention will be described now by way of example only with particular reference to the accompanying drawings. In the drawings.

DESCRIPTION OF THE PREFERRED EMBODIMENTS

Figure 1:
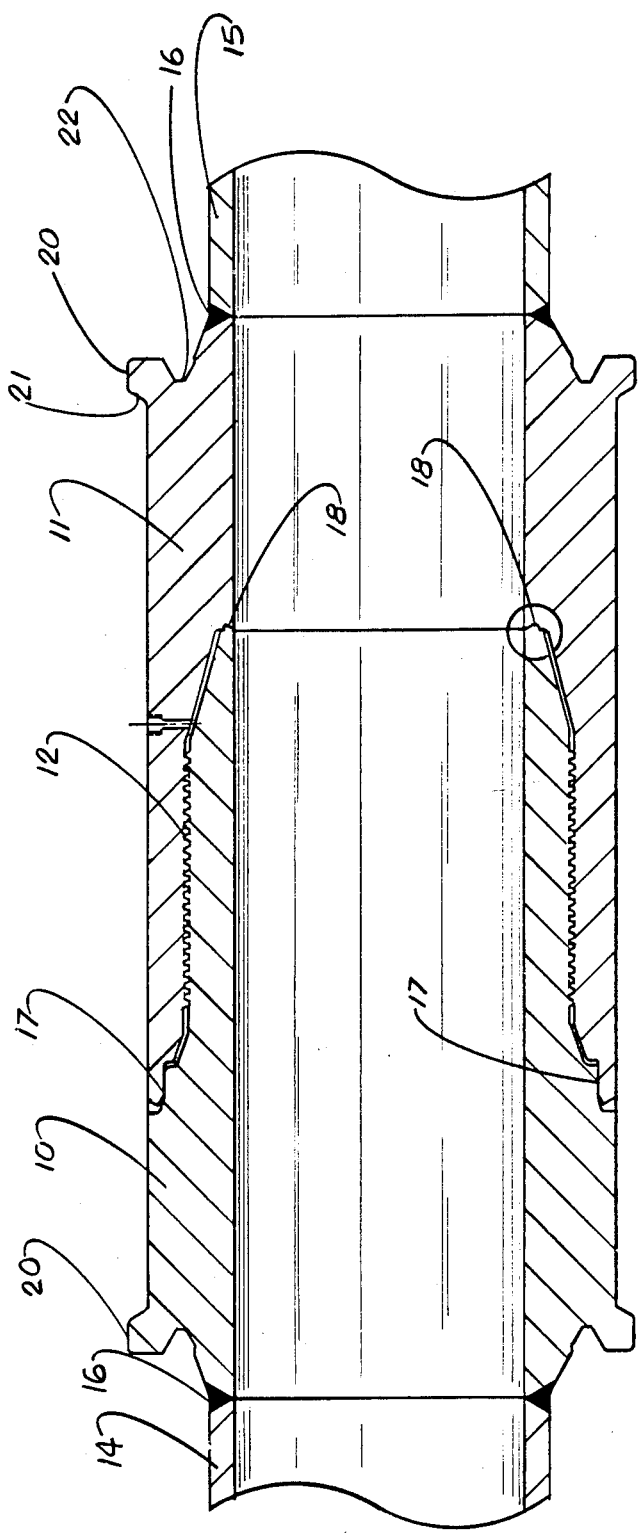
FIG. 1 is an axial section through a connector/buckle arrestor in accordance with the present invention.
Figure 1A:
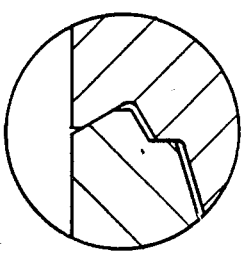
Figure 2:
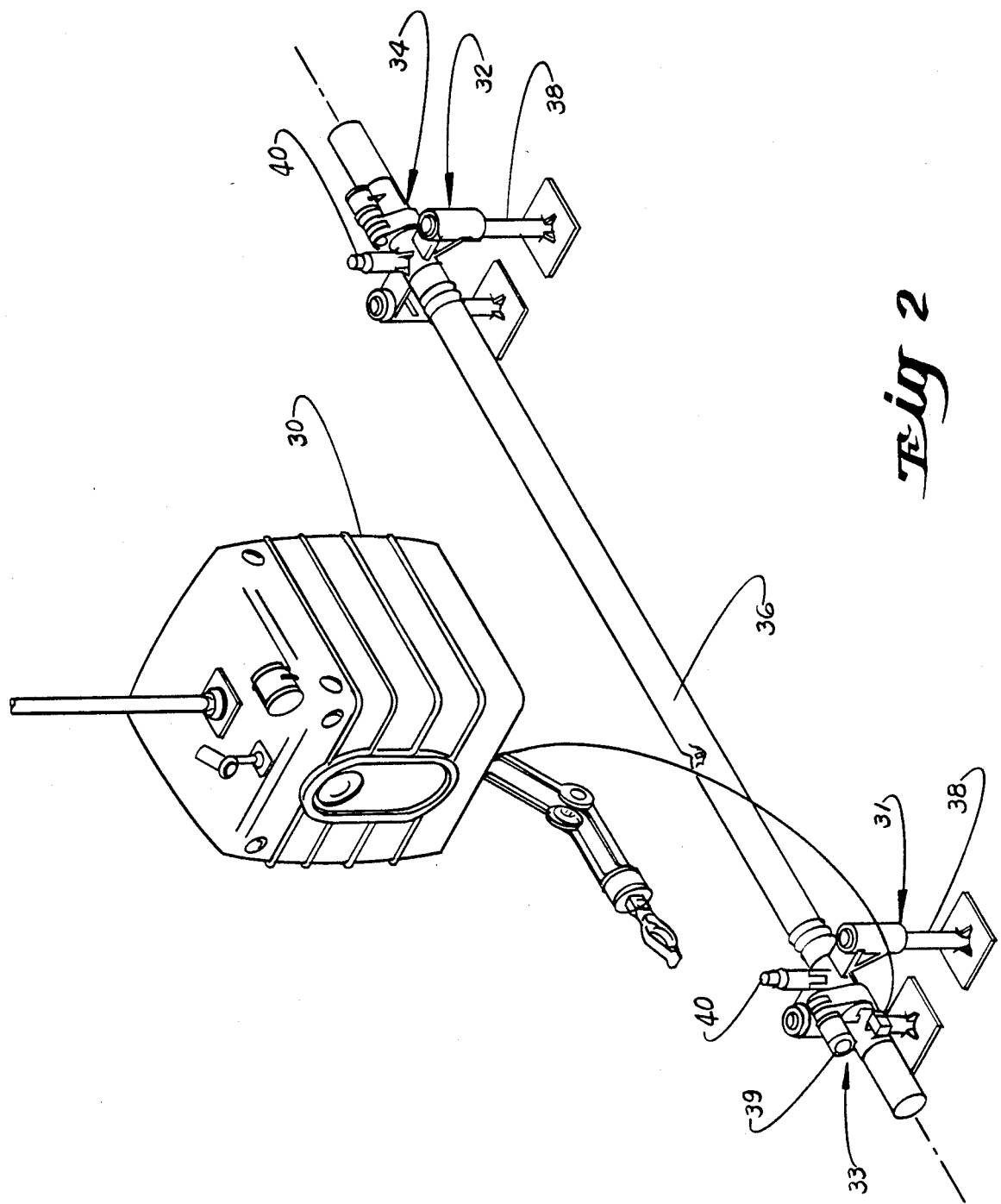
FIGS. 2 to 7 illustrate the steps involved in a method of repairing a damaged pipeline in accordance with the present invention.

A connector/buckle arrestor for use in connecting together subsea pipeline sections comprises a male connector portion 10 and a female connector portion 11 which can be connected together by a screw connection 12. The screw connection comprises buttress type threads, with 2 threads per inch. Each connector portion is connected to its respective pipeline section 14, 15 by a weld 16. As can be seen the wall thickness of each connector portion is substantially greater than that of the pipeline sections so that the connector in use operates to resist the propagation of buckles along the pipeline. The mating surfaces of the connector portions shown at 17, 18 constitute sealing surfaces.

Each connector portion 10, 11 is formed with an annular flange 20. The flange 20 constitutes a means of attachment for a collet type connector in the event that damaged pipeline sections have to be repaired. Each flange 20 defines a surface 21 against which the fingers of collet type connector can engage and a surface 22 which can provide a seat for a seal. A feature of the connector shown in FIG. 1 is that it incorporates a buckle arrestor and also serves as a repair component when pipeline sections are replaced.

It will be appreciated by those skilled in the art that connectors of the type shown in FIG. 1 are usually assembled on the surface e.g. on a pipeline laying vessel and then lowered to the sea bed.

The steps involved in repairing a damaged pipeline by the present method will now be described with reference to FIGS. 2 to 7. The first step in response to a leak or serious damage is to lower from the surface a Remote Control Vehicle (RCV) which is equipped with a video camera and transponder. The RCV is used to survey the pipeline and to determine the extent and location of the damage. When the damaged section has been located a second RCV having specialized mechanical capabilities is lowered. This RCV is indicated at 30 in FIG. 2. The RCV 30 is used to attach guide modules 31, 32 to the two flanged connectors 33, 34 at the ends of the damaged pipeline section 36. The guide modules 31, 32 include extendible legs 38 which can be actuated to raise the pipeline from the sea bed, a transponder 39 with a power source, and guideposts 40 for locating a repair tool.

Figure 3:
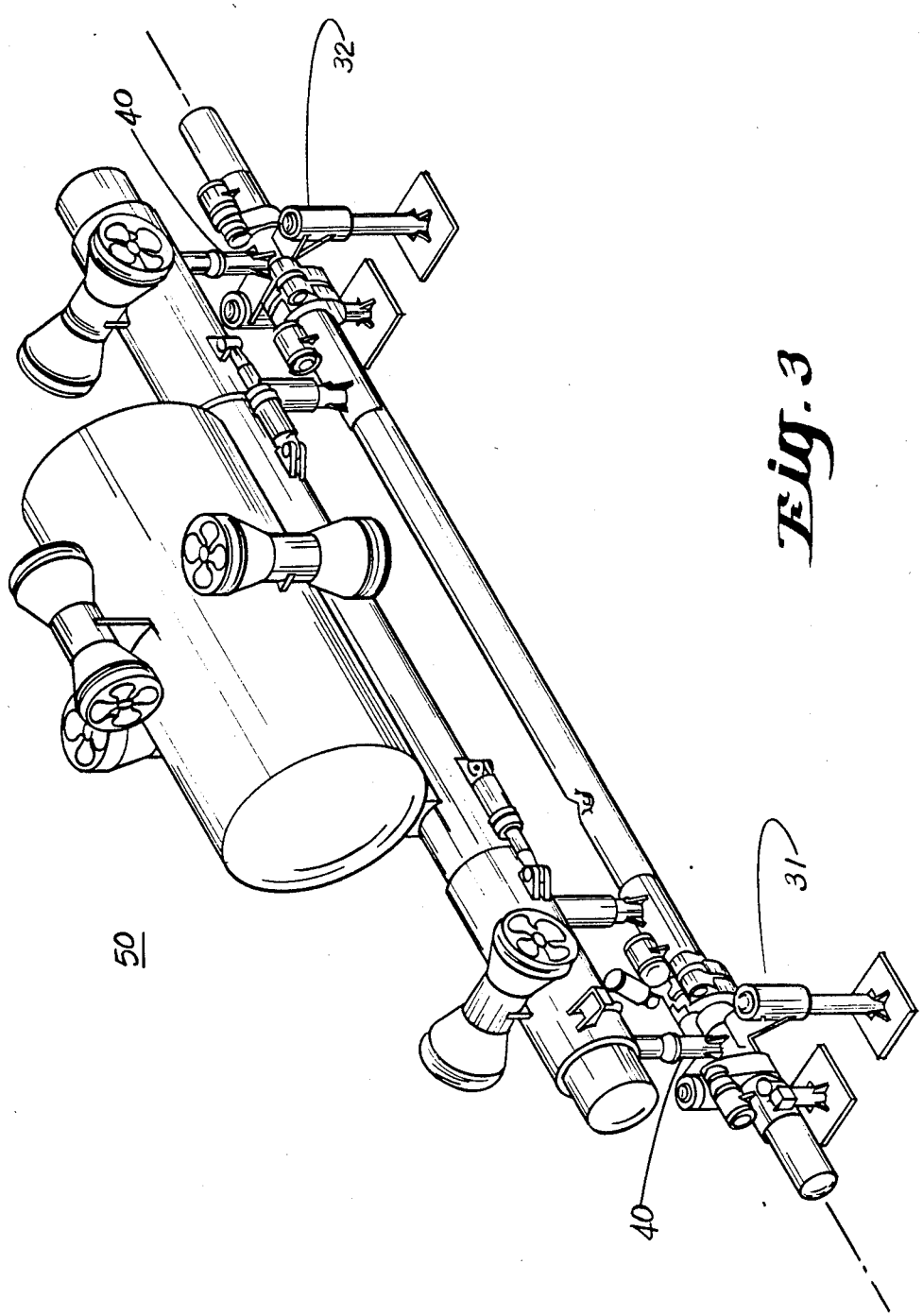
Figure 4:
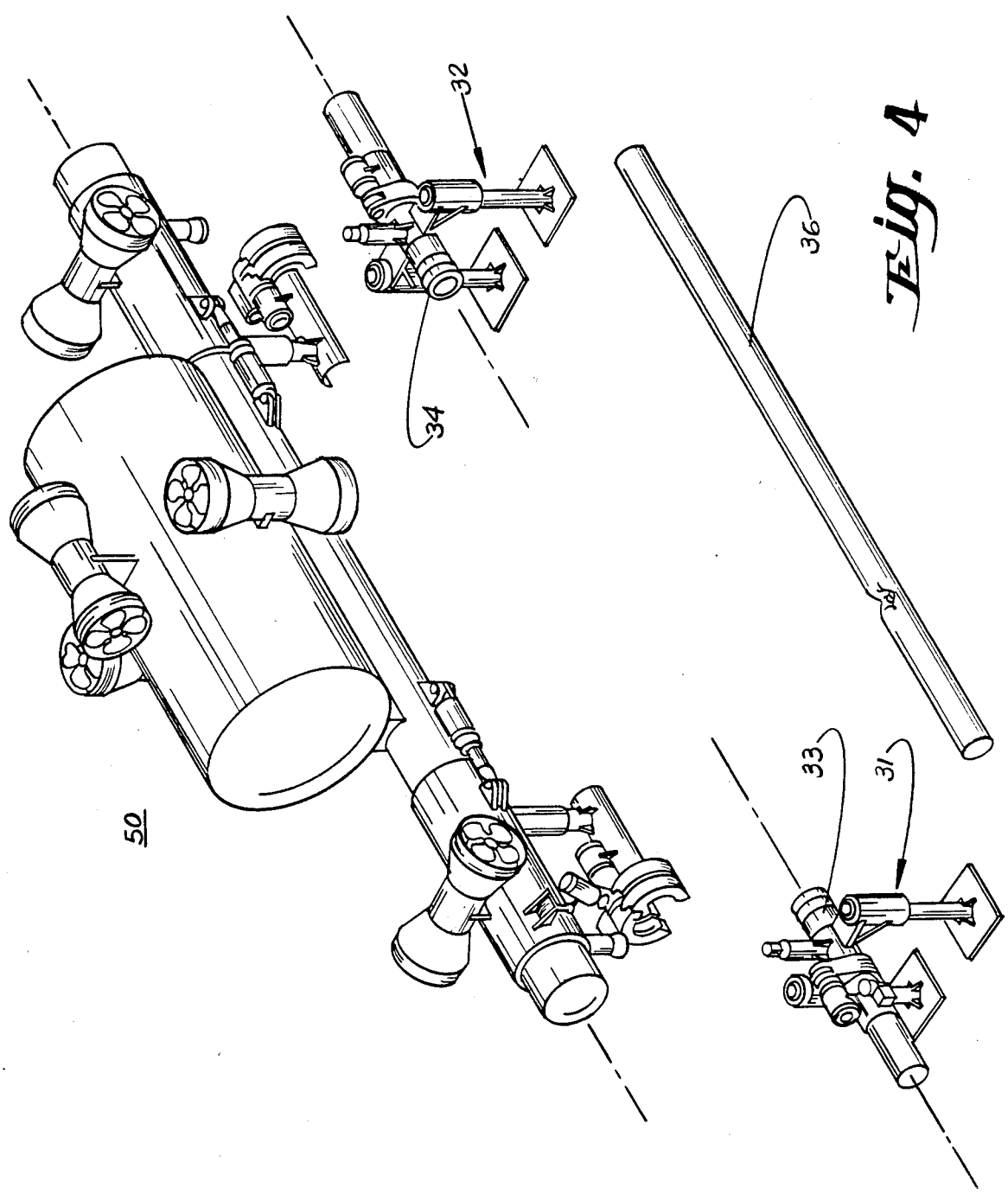

When the guide modules 31, 32 have been attached a repair module 50 is lowered (FIG. 3). This essentially comprises self-propelled strongback and is docked onto the guide modules. The repair module 50 includes cutting equipment for cutting the damaged pipeline section at its junction with the connectors 33, 34. The repair module cleans and prepares the ends, removes the damaged section and measures the length and alignment requirements that the replacement section will have to accommodate. Measurement is required because of the possibility of the pipeline shifting when damaged or when the cuts are made and includes determination of length and angular misalignment. The repair module is returned to the surface with the measurements (FIG. 4).

The replacement section can then be fabricated in accordance with the measured requirements. Since the replacement section will include at least three swivels, measurements need not be highly accurate. The swivels will accommodate angular and linear inaccuracies.

It should be noted that swivels manufactured by Cameron Iron Works, Inc. have already been tested satisfactorily at 3000 feet with all indications being that they will maintain integrity at much greater depths. The sealing mechanism is such that it will accommodate extreme pressure differentials.

Several methods of measuring the distance to be accommodated by a repair section exist. Use of an inertial guidance system is one possibility, but a simpler, more direct method is to equip the strongback of the repair module 50 used to cut the damaged section with a movable track on one or both ends. With one end attached to a guidepost 40, the other end will be remotely manipulated until it is aligned with the second guidepost. Thereby providing a rather precise linear measurement between the two guideposts. The degree of angular misalignment will be measured from the orientation of the cutting tool once it has been clamped into position. The cutting tool will be locked onto the pipeline with the assistance of underwater TV.

Figure 5:
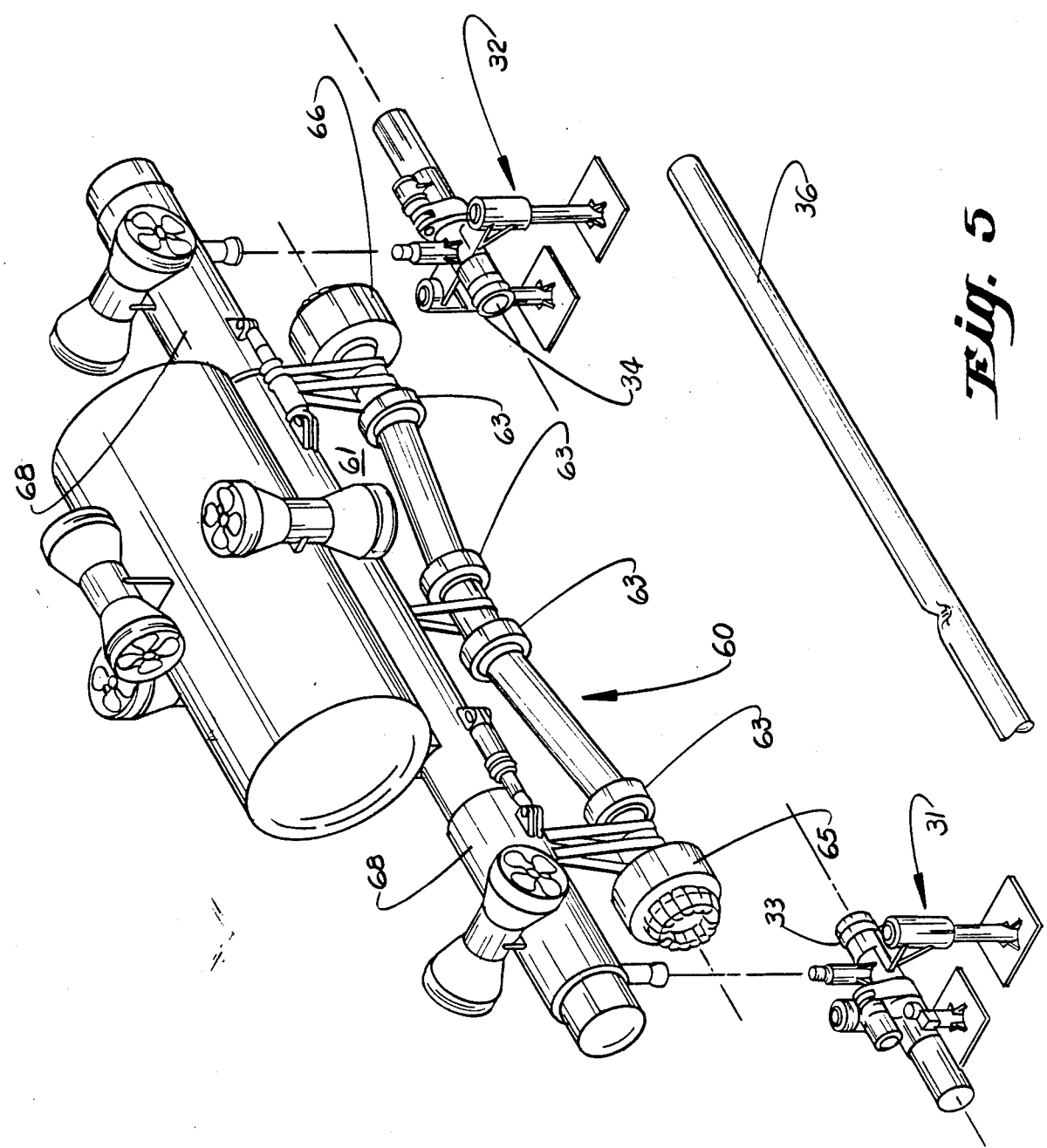

When these measurements have been completed, the replacement section 60 is built and suspended from a second strongback 61 (FIG. 5). This strongback is equipped with hydraulically actuated positioning assemblies on each end, and is employed to lower the repair section.

The replacement section 60 includes swivels 63 and a collet connector 65, 66 at each end thereof. As shown in FIG. 5 the swivels allow the axial extent of the replacement section to be reduced so that it can be located between connectors 33, 34.

Figure 6:
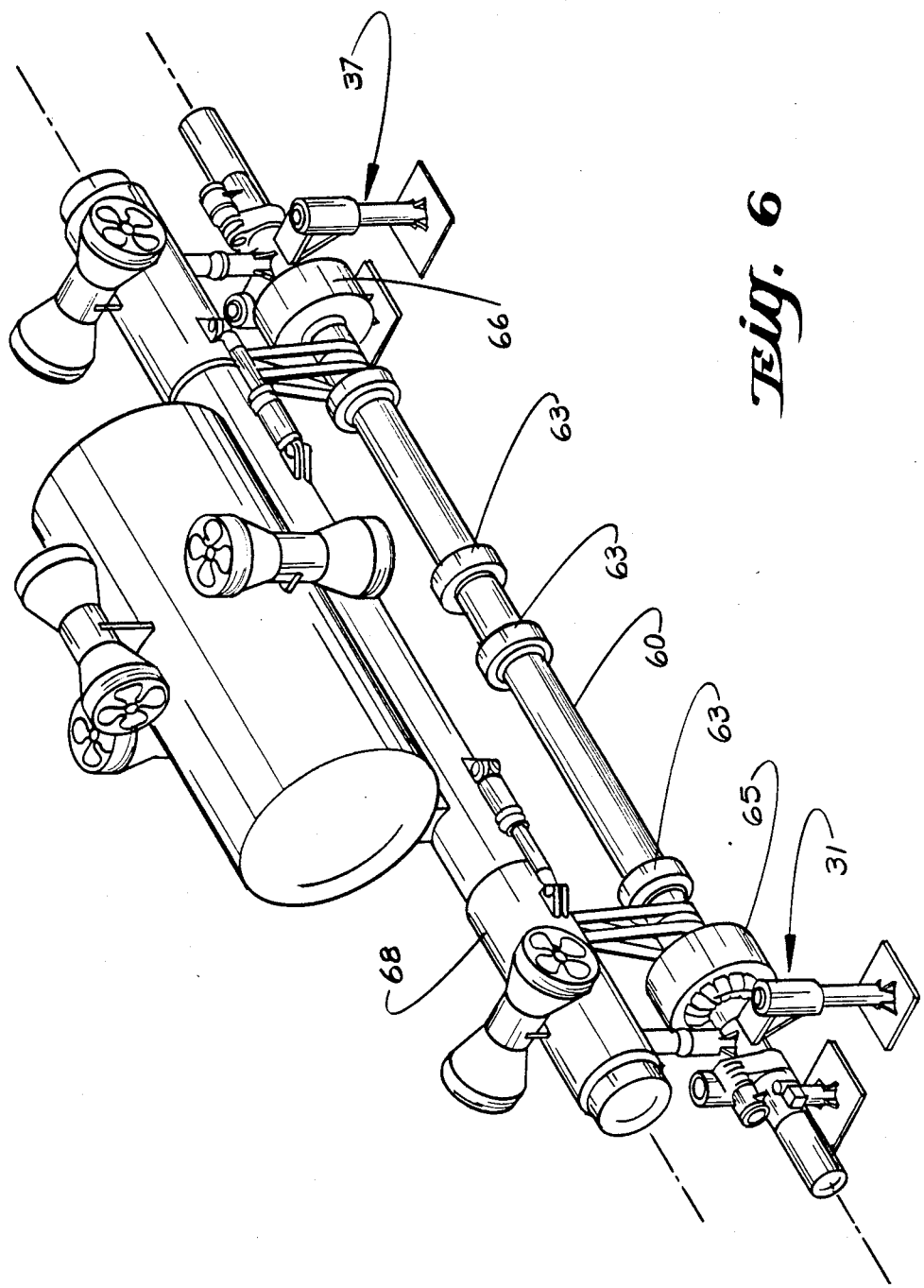

With the replacement section 60 in the configuration shown in FIG. 5 the strongback 61 is operated to position the section 60 between the connectors 33, 34. The positioning assembly 68 on the strongback is then extended so that the collet connectors 65, 66 on the ends of the section 60 engage and lock onto the flanges 20 of the connectors 33, 34 (FIG. 6). A seal also engages against the sealing surface of each flange 20.

Figure 7:
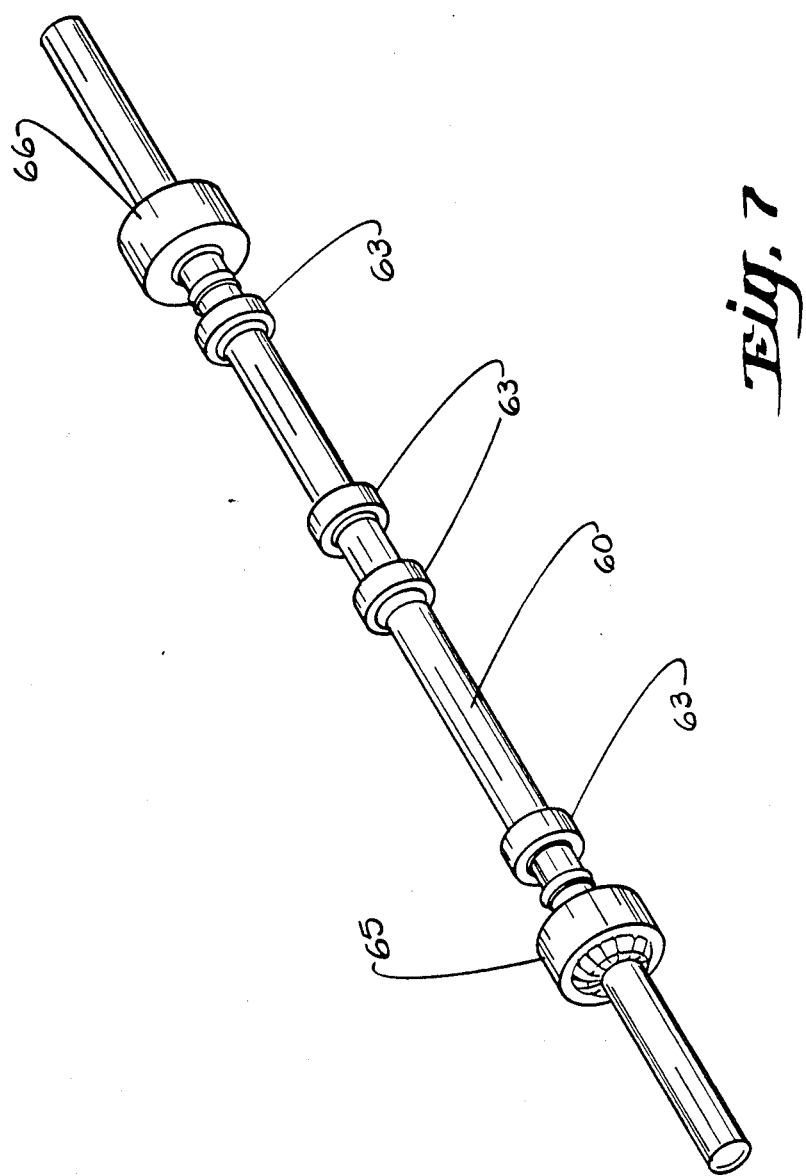

The replacement is now effectively complete and all that remains is to test the connection. The seal can be tested by pressurizing the annular space outside the sealing gasket normally with air. If blocked-in air pressure remains constant the seal is good and repair system can be retrieved. A completed repair is shown in FIG. 7.

The arrangement described above has been designed for pipe diameters of up to 36 inches. It will be appreciated that the novel connector/buckle arrestor does not have to be used at every pipeline section joint. It is envisaged that the novel flanged connectors will be used at every third or fourth joint with more conventional connectors being used at other joints. For a pipe section length of 80 feet this will result in replacement sections being approximately 240 feet or 320 feet long.

The invention has been described above in terms of a screw type connector which also operates as a buckle arrestor. It will be appreciated that the flanges 20 could be provided on a buckle arrestor which is not a threaded connector. Such arrestors are generally tubular members which are welded between pipeline sections and have wall thicknesses which are such that they resist the propagation of buckles along the pipeline. The repair of a damaged section would be carried out as described above.

Figure 8:
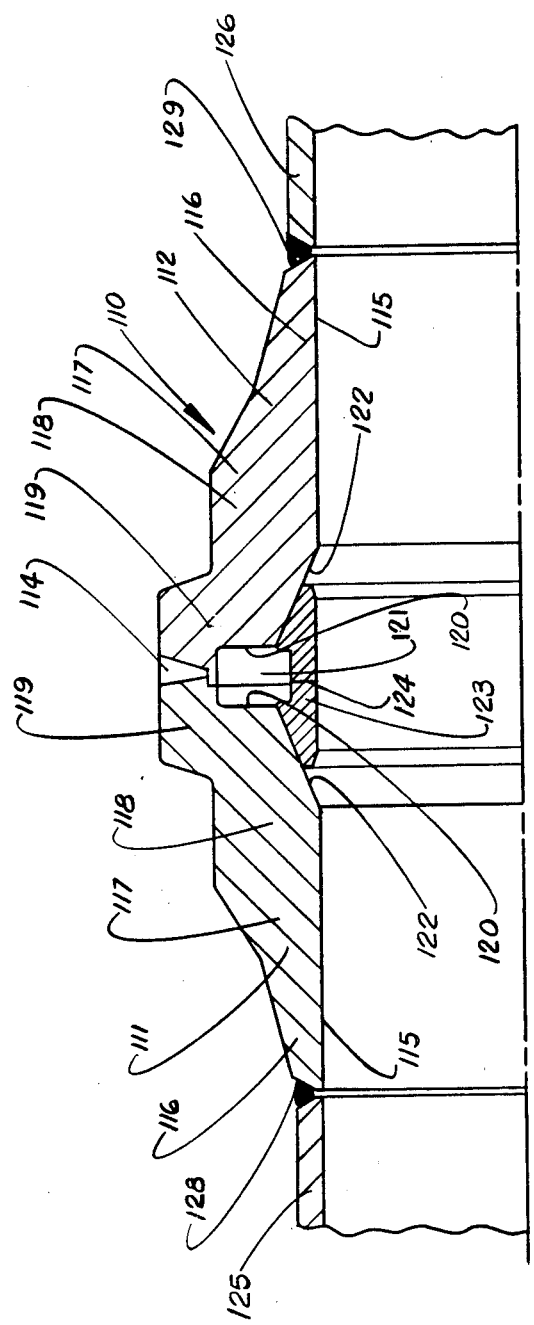
FIG. 8 is a section through a buckle arrestor in accordance with the present invention.

The alternative form of buckle arrestor is shown generally at 110 in FIG. 8. The arrestor is a generally tubular member which is formed from two axially aligned parts 111 and 112 which are welded together at their junction by means of a circumferential weld 114. The part 111 is the mirror image of the part 112 so that the arrestor is symmetrical about a diametrical line through the weld 114. Each arrestor part 111, 112 has an axially outer portion 115 whose inner wall surface is cylindrical, the wall in section having two frusto-conical portions 116, 117 arranged so that the wall thickness increases from its end portion towards a generally tubular portion 118. The tubular portion 118 is formed integrally with a profiled portion 119 which forms the inner end of each arrestor part. The end face of the profiled portion 119 is recessed at 120 so that the two juxtaposed end portions together define an annular recess 121 at a central region of the arrestor. The inner surface of each profiled portion 119 is inclined at a small angle to the axis of the arrestor to define a surface 122 against which an outer surface of an annular gasket 123 can engage. The annular gasket 123 has a radially extending aperture 124 to provide a communication between the bore of the arrestor and the recess 121.

The arrestor shown in FIG. 8 is connected to respective pipeline sections 125, 126 by means of a weld shown schematically at 128, 129. The manner in which a pipeline incorporating buckle arrestors 110 is constructed will be apparent to those skilled in the art and has been described briefly above.

When it is required to repair a damaged pipeline section this can be carried out using remote control vehicles generally in the manner described above. However, in the present case instead of cutting the damaged section at the weld, e.g. 129 between a damaged pipeline section and the buckle arrestor, the cut is made diametrically through the weld 114 between the arrestor parts 111 and 112. This leaves one part of an arrestor connected to the undamaged pipeline, the exposed end of the arrestor having the profiled part 119 which constitutes a means of attachment for a collet type connector on the end of a replacement pipeline section. Measurements in respect of the replacement section can be made as described above and the new section can be manufactured accordingly. It is then lowered from the surface to a position in which it can be connected to the existing pipeline in the place of the damaged section. Equipment for making the cut and the measurements can be located accurately relative to the buckle arrestor 110 by making use of the inclined surfaces of frusto-conical portions 116, 117 as locating surfaces.

Figure 9:
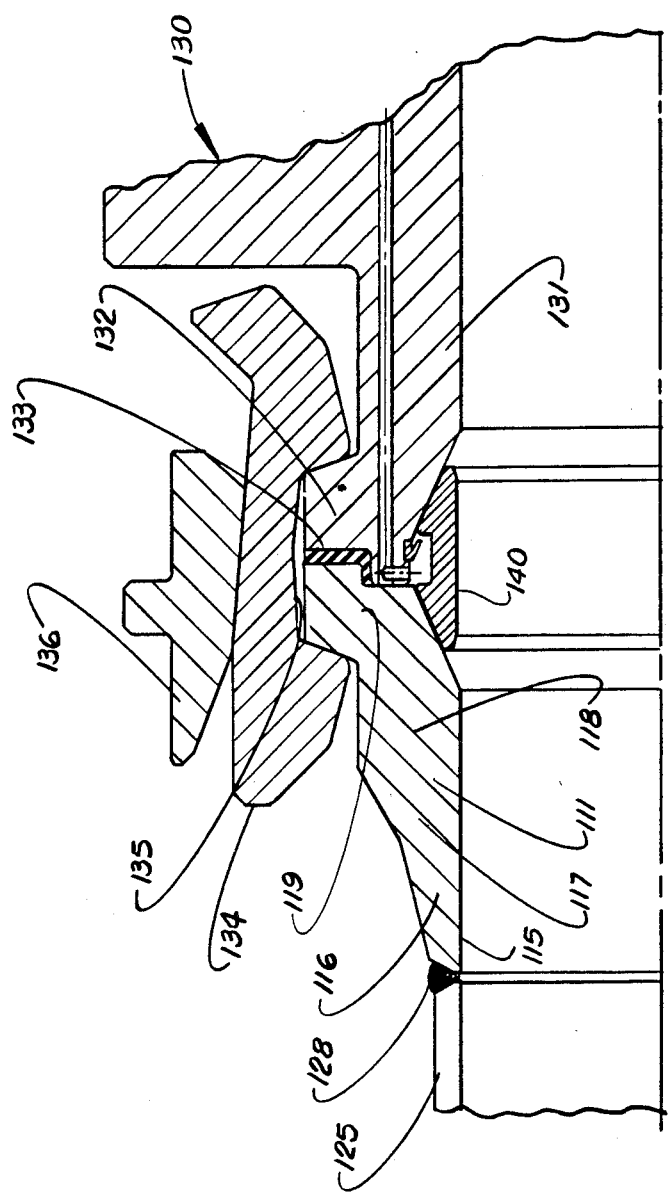
FIG. 9 is a section similar to that of FIG. 8 illustrating the manner in which a pipeline incorporating the buckle arrestor can be repaired.

Referring to FIG. 9 of the drawings the replacement pipeline section has on each end thereof a collet type connector indicated generally at 130. The collet type connector has a tubular part 131 which extends axially from the main collet body and terminates in a profiled portion 132 which corresponds generally in shape to that of the profiled portion 119 on the end of the buckle arrestor part 111. A soft rubber seal 133 is disposed between the end of the profiled part 131 and the profiled part 119. The collet connector is held in position by means of a pivotal arm 134 which can be pivoted downwardly so that a recess 135 formed on its lower surface engages the juxtaposed profiled portions 131 and 119. The arm 134 is held in this position by means of a locking member 136 which is located in position after the arm 134 has been pivoted downwardly. The collet connector 130 has formed therein a test port which can be used to test the seal between the collet connector 130 and the buckle arrestor part 111. A new gasket 140 can be located within the bore at a position corresponding to the original gasket 123.

It will thus be seen that in the arrangement of FIGS. 8 and 9 the profiled portion which forms the attachment means for a collet connector is located towards the central region of the buckle arrestor. This has the advantage that when a damaged section is repaired the part of the buckle arrestor which is joined to the damaged section is removed prior to replacement of a new section. This is advantageous because when a buckle is propagated along a pipeline the end portion of the arrestor which resists propagation of the buckle can become damaged since the buckle may propagate part way along the arrestor. That part of the buckle arrestor is removed prior to replacement of the damaged pipeline section.

What is claimed is:

1. A connector for connecting pipeline sections comprising,
   a tubular member having interconnectible male and female portions,
   one portion in use being joined to an end of one pipeline section and the other portion being joined to the adjacent end of another pipeline section which is to be connected to the one section,
   each of the connector portions having an external profile to define a means of attachment for a collet type connector including a surface to receive collet fingers and a surface to receive a seal ring whereby when the two portions are connected and then severed from the pipeline section at one end a collet connector may be used to reconnect to the severed end.

2. A connector as claimed in claim 1 wherein the profile comprises an annular flange on each connector portion.

3. A connector as claimed in claim 1 wherein the connector is a screw connector.

4. A connector according to claim 1 including
   said tubular member having substantially greater wall thickness than the pipeline section to which it is to be connected whereby it resists propagation of buckles propagating along the pipeline.

* * * * *